United States Patent [19]

Uryu

[11] Patent Number: 5,564,307
[45] Date of Patent: Oct. 15, 1996

[54] SEATBELT PRE-TENSIONER

[75] Inventor: Naoyuki Uryu, Aichi Pref., Japan

[73] Assignee: Aisin Seiki Kabushiki Kaisha

[21] Appl. No.: 268,191

[22] Filed: Jun. 29, 1994

[30] Foreign Application Priority Data

Jun. 30, 1993 [JP] Japan .................................. 5-160709

[51] Int. Cl.$^6$ .................................................. B60R 22/46
[52] U.S. Cl. .................. 74/2; 280/806; 297/480
[58] Field of Search .................. 74/2; 297/480, 297/478; 280/806

[56] References Cited

U.S. PATENT DOCUMENTS

| 4,435,000 | 3/1984 | Chiba et al. | 297/480 |
| 4,913,497 | 4/1990 | Knabel et al. | 297/480 |
| 4,999,004 | 3/1991 | Skanberg et al. | 297/480 |
| 5,009,249 | 4/1991 | Fisher et al. | 74/2 |
| 5,234,181 | 8/1993 | Schroth | 297/480 |
| 5,288,105 | 2/1994 | Ikegaya et al. | 297/480 |
| 5,377,554 | 1/1995 | Reulein et al. | 74/2 |

FOREIGN PATENT DOCUMENTS

| 4027342A1 | 4/1991 | Germany . |
| 2-256550 | 10/1990 | Japan . |
| 3-51657 | 5/1991 | Japan . |

OTHER PUBLICATIONS

Official Letter dated Jul. 17, 1995 (1 page) German Translation.

*Primary Examiner*—Charles A. Marmor
*Assistant Examiner*—David Fenstermacher
*Attorney, Agent, or Firm*—Finnegan, Henderson, Farabow, Garrett & Dunner

[57] ABSTRACT

A preloader apparatus includes a base member, an acceleration detector fixed on the base member, a rod movably mounted on the base member, a first link pivotably mounted on the base member and operatably connected with the acceleration detector, a second link pivotably mounted on the base member, wherein the second link is normally connected to the first link but able to be disconnected from the first link so as to be rotated to let the rod become movable, and a force member for forcing the first link to be kept normally connected with the second link.

5 Claims, 3 Drawing Sheets

SEATBELT PRE-TENSIONER

BACKGROUND OF THE INVENTION

1. Field of the Invention

This invention relates to a preloader apparatus, and in particular relates to a preloader apparatus for tensing a seat belt of a vehicle when acceleration is applied to the vehicle.

2. Description of the Related Art

A conventional preloader apparatus is disclosed in the Japanese Utility Model Laid Open No. 3 (1991)-51657. The preloader apparatus disclosed in the prior art comprises a base member fixed to a vehicle, an operating member operated by acceleration applied to the vehicle, a rod movably mounted on the base member, a first link pivotably mounted on the base member and connected with the operating member, a second link connected with the first link and the rod so as to move the rod by rotation thereof. In accordance with the prior art, when the first link is rotated by the operation of the operating member, the second link is disconnected with the rod so as to let the rod be moved by an elastic force of a spring. Therefore, an anchor of the seat belt is moved in a direction to tense the seat belt.

Another conventional preloader apparatus is disclosed in the Japanese Patent Laid Open No. 2 (1990)-256550. This preloader apparatus disclosed in the prior art comprises a base member fixed to the vehicle, an operating member operated by acceleration applied to the vehicle, a rod movably mounted on the base member, a first link bendably mounted on the base member and connected with the operating member, a second link connected with the first link and the rod so as to move the rod by rotation thereof. In accordance with the prior art, when the first link is bent by the operation of the operating member, the second link is disconnected with the first link so as to release the rod so it can be moved by an elastic force of a spring disposed between the rod and the base member. Therefore, an anchor of the seat belt is moved in a direction to apply tension to the seat belt.

However in accordance with the prior arts, since the operation of the first link is not regulated, the second link that prevents the rod from moving can be set free toward the operational direction. Therefore, when an acceleration under a predetermined value to be detected is applied to the vehicle, the operation of the preloader apparatus becomes unstable.

SUMMARY OF THE PRESENT INVENTION

It is an object of the present invention to provide a preloader apparatus which is stably operated.

It is another object of the present invention to provide a preloader apparatus which is convenient to be manufactured.

It is a further object of the present invention to provide a preloader apparatus which comprises durability.

It is a further object of the present invention to provide a preloader apparatus which is simple in structure and small in size.

It is a further object of the present invention to provide a preloader apparatus which is low in cost.

To achieve the above mentioned objects and in accordance with the purpose of the invention, as embodied and broadly described herein, a preloader apparatus in accordance with this invention comprises a base member, an acceleration detector fixed on the base member, a rod movably mounted on the base member, a first link pivotably mounted on the base member about a first axis so as to be pivotably in a first direction and operable by the acceleration detector, a second link pivotably mounted on the base member about a second axis so as to be pivotably in a second direction substantially perpendicular to said first direction, and wherein the second link is in contact with the first link, the movement of said rod being responsive to the pivoting of the second link out of contact with the first link, and force means for biasing the first link against pivoting so as to be kept in contact with the second link.

BRIEF DESCRIPTION OF THE DRAWINGS

The features and advantages of the preloader apparatus according to the present invention will be more clearly appreciated from the following description in conjunction with the accompanying drawings wherein.

DETAILED DESCRIPTION OF PREFERRED EMBODIMENT OF THE INVENTION

Figure 1:
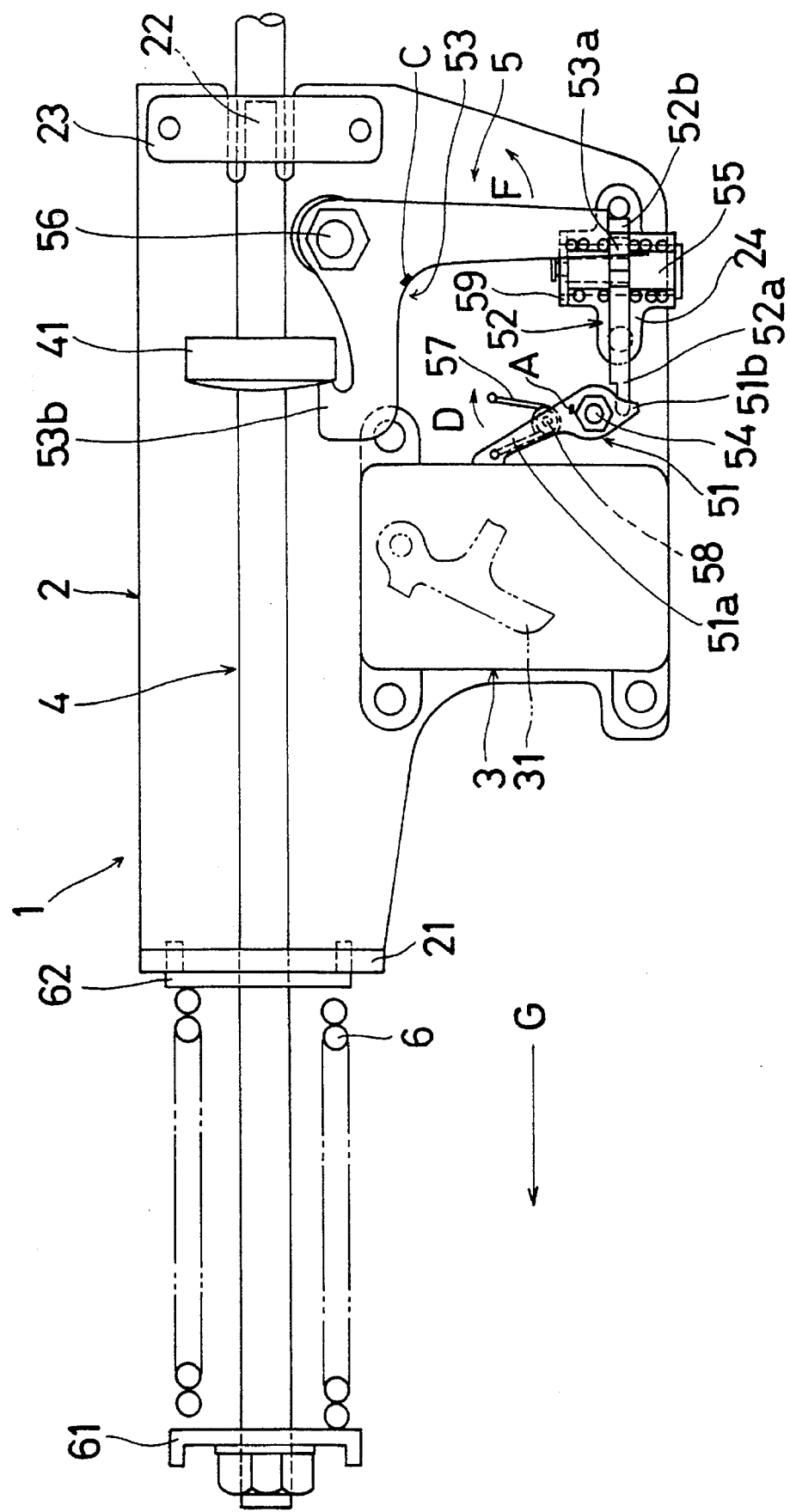
FIG. 1 is a elevational view of a preloader apparatus of the prevent invention.
Figure 2:
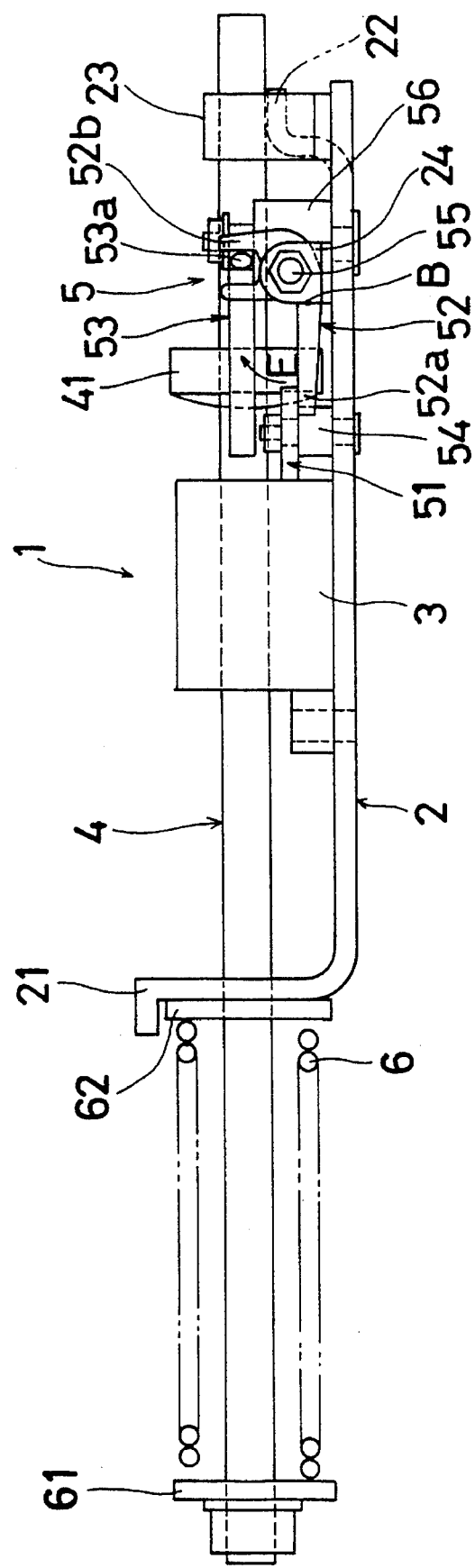
FIG. 2 a bottom view of the FIG. 1 of a preloader apparatus of the present invention.
Figure 3:
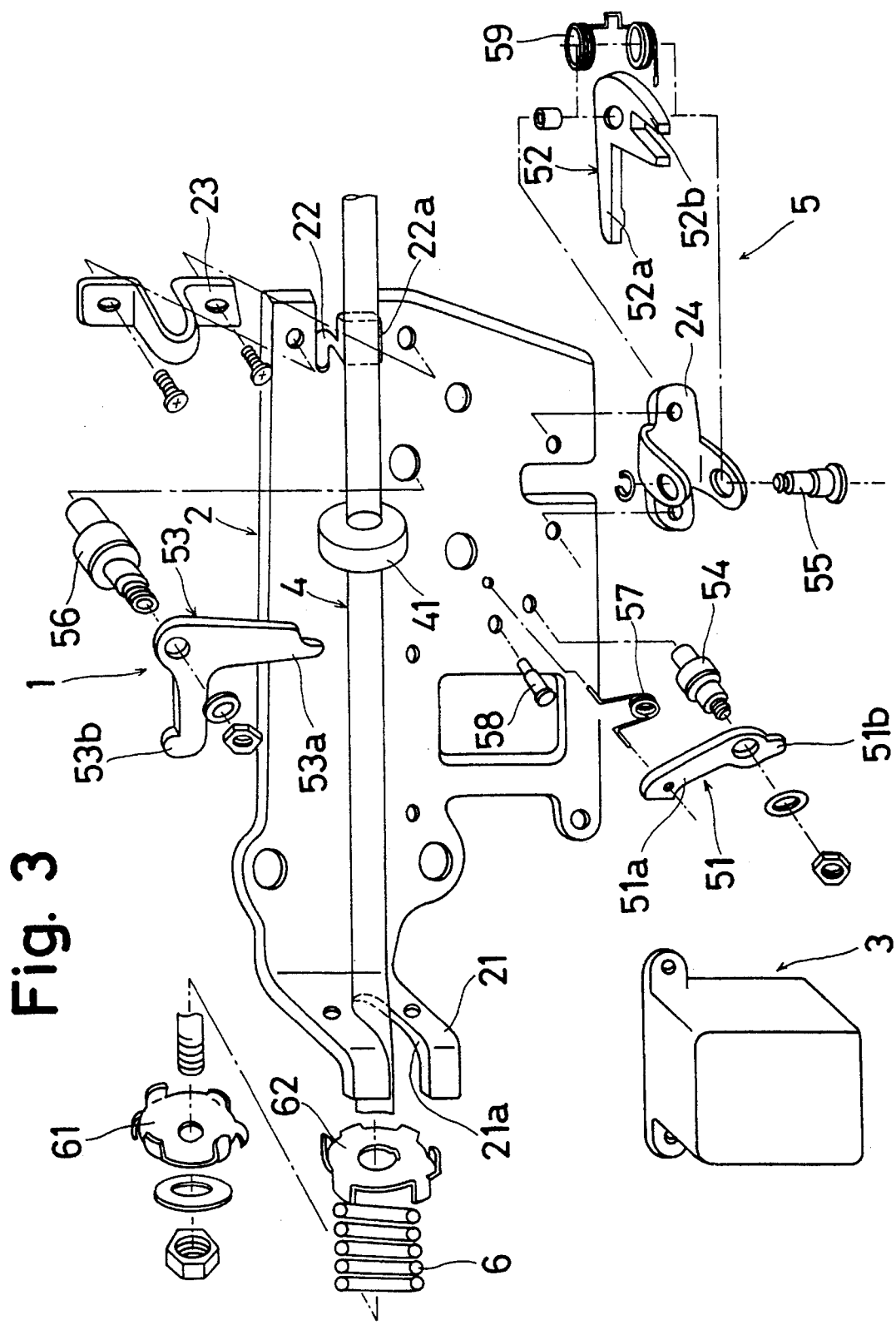
FIG. 3 is an exploded view in perspective of a preloader apparatus of the present invention.

Referring to the FIGS. 1 to 3, a preloader apparatus 1 comprises a base member 2, an impact detecting device 3, a rod 4 and a link mechanism 5. The base member 2 is fixed on a side portion of a seat (not shown in the FIGURES) of a vehicle. When the impact detecting device 3 which is conventional received an acceleration over a predetermined value in the forward direction of the vehicle which is continued for a predetermined period, an output member 31 of the impact detecting device 3 is projected out by an elastic force of a spring (not shown in the FIGURES). The impact detecting device 3 is fixed on the base member 2.

A rod 4 movably mounted on the base member 2 is connected with an anchor of a seat belt (not shown in the FIGURES) through a wire not shown in the FIGURES). As shown in the FIG. 3, one end of the rod 4 is inserted through a slot 21a of a flange portion 21 and the other end of the rod 4 is in contact with a supporting surface 22a of a flange 22 and clamped by a bracket 23 so as to be fixed on the base member 2. A spring 6 is disposed between the rod 4 and the base member 2. One end of the spring 6 is connected with the rod 4 through a seat member 61 and the other end of the spring 6 is connected with the flange portion 21 of the base member 2 through a seat member 62. The rod 4 is always forced in the front direction of the vehicle (in the left direction shown in the FIG. 1) by the elastic force of the spring 6 so as to be moved in the front direction of the vehicle. The rod 4 includes a block 41 for connecting the rod 4 and the link mechanism 5.

The link mechanism 5 includes a first link 51, a second link 52 and a third link 53. The first link 51 is pivotably mounted about a first axis 54 which is fixed on the base member 2 so as to be extended in a width direction of the vehicle. The second link 52 is pivotably mounted about a second axis 55 which is fixed on the base member 2 through a bracket 24 so as to be extended in a vertical direction of the vehicle. The third link 53 is pivotably mounted about a third axis 56 which is fixed on the base member 2 so as to be extended in the width direction of the vehicle.

The first link 51 includes a first foot portion 51a which is engagable with the output member 31 of the impact detecting device 3. The first link 51 further includes a first engaging portion 51b disposed at an opposite portion to the first foot portion 51a with respect to the first axis 54 which is able to be engaged and disengaged with the second link 52. The second link 52 includes a second foot portion 52a which is engagable and disengagable with the first engaging portion 51b and a second engaging portion 52b which is able to be engaged and disengaged with the third link 53. The third link 53 includes a third foot portion 53a which is engagable and disengagable with the second engaging portion 52b and a third engaging portion 53b which is able to be engaged and disengaged with the block 41 of the rod 4. Each of centers of gravity A, B and C of the first, second and third links 51, 52 and 53 is located at the same side as the first, second and third foot portions 51a, 52a and 53a with respect to the axes 54, 55 and 56 respectively.

An end surface of the first engaging portion 51b of the first link 51 is engaged with a side surface of the second foot portion 52a of the second link 52 by the friction force between the first engaging portion 51b and the second foot portion 52a. A first spring 57 is supported on the base member 2 by a pin 58. One end of the first spring 57 is fixed on the base member 2 and the other end of the first spring 57 is connected with the first link 51. The first link 51 is biased so as to be rotated in order that the first engaging portion 51b and the second foot portion 52a may engage each other. Further, a second spring 59 is supported on the base member 2 by the second axis 55. The second link 52 is forced by the second spring 59 so as to be rotated in order that the first engaging portion 51b and the second foot portion 52a may engaged each other and the second engaging portion 52b and the third foot portion 53a may be disengaged.

An operation of the preloader apparatus 1 will be described hereinafter. The unoperated condition of the preloader apparatus 1 is shown in the FIG. 1. The first link 51 is positioned so as to connect the first engaging portion 51b and the second foot portion 52a. The first link 51 is prevented from being rotated by the friction force between the first engaging portion 51b and the second foot portion 52a. As shown in FIG. 1, the second link 52 is prevented from being rotated against the elastic force of the second spring 59 by the engagement of the first engaging portion 51b and the second foot portion 52a. The second link 52 is kept in a position so as to connect the second engaging portion 52b and the third foot portion 53a. The third link 53 is prevented from being rotated against the elastic force of the spring 6 by the engagement of the second engaging portion 52b and the third foot portion 53a. The third link 53 is kept in positioned so as to connect the third engaging portion 53b of the third link 53 and the block 41 of the rod 4. Further, the rod 4 is prevented from being moved against the elastic force of the spring 6 by the engagement of the third engaging portion 53b and the block 41.

When an acceleration over a predetermined value which continues for a predetermined period is applied to the vehicle in the front direction of the vehicle because of a collision of the vehicles, the output member 31 of the impact detecting device 3 is projected out so as to be engaged with the first foot portion 51a of the first link 51. The first link 51 is rotated in D direction shown in the FIG. 1 against the elastic force of the first spring 57 and the friction force between the first engaging portion 51b and the second foot portion 52a by the output member 31. Therefore, the first engaging portion 51b and the second foot portion 52a are disengaged. When the second link 52 is not regulated against rotation by the first link 51, the second link 52 is rotated in E direction shown in the FIG. 2 by the elastic force of the second spring 59 in order that the second engaging portion 52b and the third foot portion 53a may be disengaged. Therefore, the third link 53 is set free so as to be able to be rotated. Consequently, the rod 4 is able to be moved by the elastic force of the spring 6. The rod 4 is moved in G direction shown in the FIG. 1 by the elastic force of the spring 6 so as to rotate the third link 53 in F direction shown in the FIG. 1 through the engagement between the third engaging portion 53b and the block 41. The anchor of the seat belt is drawn by the rod 4 so as to apply tension to or tighter the seat belt.

Under the condition of the preloader apparatus 1 prior to operation, when an acceleration under a predetermined value which is not continued for a predetermined period is applied to the vehicle in the front direction of the vehicle because of the collision of the vehicles or a bad road, each of the centers of gravity A, B and C of the first, second and third links 51, 52 and 53 receives the acceleration so as to be forced to be rotated respectively. However, the first link 51 is prevented from being rotated by the elastic force of the first spring 57 and the friction force between the first engaging portion 51b and the second foot portion 52a, the second link 52 is prevented from being rotated by the first link 51 whose rotation has been prevented, and the third link 53 is prevented from being rotated by the second link 52 which is in turn prevented from rotation by the first link 51. Therefore, none of the first, second and third links 51, 52 and 53 are rotated. Consequently, although the acceleration under a predetermined value which is not continued for a predetermined period in the front direction of the vehicle is applied to the vehicle, the preloader apparatus 1 is not operated. In this case, the impact detecting device 3 is not operated either.

Under the pre-operational condition of the preloader apparatus 1, when an acceleration is applied to the vehicle in the width or crosswise direction of the vehicle because of a collision or a bad road, each of the centers of the gravity A, B and C of the first, second and third links 51, 52 and 53 receives the acceleration in the width direction of the vehicle respectively. Therefore, the first and third links 51, 53 are not forced to be rotated because the rotational directions of the first and third links 51, 53 are vertical to the acceleration applied. On the other hand, the second link 52 has a rotational force applied since the rotational direction of the second link 52 is parallel to the acceleration applied. However, because the second link 52 is prevented from being rotated by the first link 51 which is regulated against rotation, the second link 52 is not rotated. Consequently, although the acceleration in the width direction of the vehicle is applied to the vehicle, the preloader apparatus 1 is not operated. In this case, the impact detecting device 3 is not operated either.

Under the pre-operational condition of the preloader apparatus 1, when an acceleration is applied to the vehicle in the vertical direction of the vehicle because of a collision or a bad road, each of the centers of the gravity A, B and C of the first, second and third links 51, 52 and 53 receives the acceleration in the vertical direction of the vehicle respectively. Therefore, the second link 52 is not forced to be rotated because the rotational direction of the second link 52 is vertical to the acceleration applied. On the other hand, the first and third links 51, 53 have a rotational force applied since the rotational directions of the first and third links 51, 53 are parallel to the acceleration applied. However, because the first link 51 is regulated against rotation by the elastic force of the first spring 57 and the friction force between the first engaging portion 51b and the second foot portion 52a and the third link 53 is prevented from being rotated by the second link 52 which is in turn prevented from rotation by the first link 51. Therefore, the first and third links 51 and 53 are not rotated. Consequently, although the acceleration in the vertical direction of the vehicle is applied to the vehicle, the preloader apparatus 1 is not operated. In this case, the impact detecting device 3 is not operated either.

In accordance with the invention, the link mechanism 5 which always regulates the rod 4 to be moved is not operated without the operation of the impact detecting device 3 because the rotation of the first link 51 is regulated by the elastic force of the first spring 57 and the friction force between the first engaging portion 51b and the second foot portion 52a, the rotation of the second link 52 is regulated by the first link 51 whose rotation is also regulated, and the rotation of the third link 53 is regulated by the second link 52 whose rotation is regulated by the first link 51. Therefore, since the preloader apparatus 1 is not operated without the acceleration having the direction and the value to be detected, the preloader apparatus 1 can be stably operated. Because the rotation of the first link 51 is regulated by the elastic force of the first spring 57 and the friction force between the first engaging portion 51b and the second foot portion 52a, the first link 51 is rotated by a rather small force. Therefore, the first link can be rotated by the operation of the output member 31 of the impact detecting device 3 without any additional release mechanism to release the first link 51. Consequently, the preloader apparatus can be small in size and low in cost.

While the invention has been particularly shown and described with reference to preferred embodiment thereof, it will be understood by those skilled in the art that the foregoing and other changes in form and details can be made therein without departing from the spirit and scope of the invention.

What is claimed is:

1. A preloader apparatus comprising:

a base member;

an acceleration detector fixed on the base member;

a rod movably mounted on the base member;

a first link pivotably mounted on the base member about a first axis so as to be pivotably in a first direction and operable by the acceleration detector;

a second link pivotably mounted on the base member about a second axis so as to be pivotably in a second direction substantially perpendicular to said first direction, and wherein the second link is in contact with the first link, the movement of said rod being responsive to the pivoting of the second link out of contact with said first link; and force means for biasing the first link against pivoting so as to be kept in contact with the second link.

2. A preloader apparatus as recited in claim 1, wherein the first axis is substantially horizontal and the second axis is substantially vertical.

3. A preloader apparatus as recited in claim 2, wherein the force means includes a spring member disposed between the base member and the first link and which restrains the spring member against pivoting movement, until the first link is operated by the acceleration detector, and which keeps the first link in contact with the second link.

4. A preloader apparatus as recited in claim 1, wherein the force means includes a spring member disposed between the base member and the first link and which forces the first link to be in contact with the second link.

5. A preloader apparatus as recited in claim 1, wherein the force means include a friction contact between the first link and the second link.

* * * * *